July 26, 1932.  F. H. HIBBARD  1,869,196
METHOD OF AND APPARATUS FOR MEASURING REVERBERATION TIME
Filed Jan. 10, 1931
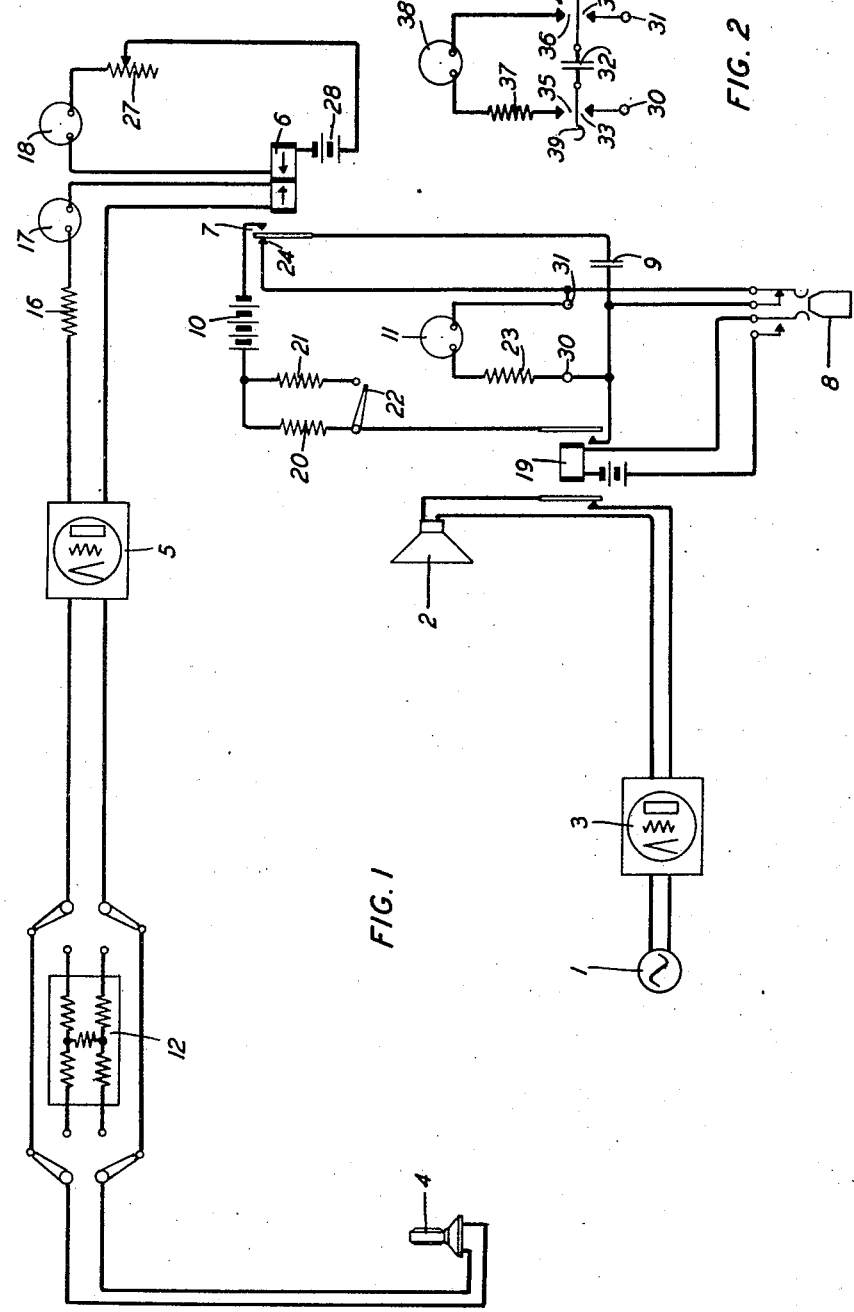
INVENTOR
F. H. HIBBARD
BY
ATTORNEY Patented July 26, 1932

1,869,196

UNITED STATES PATENT OFFICE

FRANK H. HIBBARD, OF MOUNTAIN LAKES, NEW JERSEY, ASSIGNOR TO ELECTRICAL RESEARCH PRODUCTS INC., OF NEW YORK, N. Y., A CORPORATION OF DELAWARE

METHOD OF AND APPARATUS FOR MEASURING REVERBERATION TIME

Application filed January 10, 1931. Serial No. 507,907.

This invention relates generally to measuring systems and more particularly to devices for determining the acoustical conditions of enclosed and open spaces.

The principal object of this invention is to provide a precision method of and apparatus for measuring the time of decay of the energy of sound waves. When used to measure sound wave decay, this method determines what is known as the reverberation time of the enclosed or open spaces under consideration. This time is usually defined as the interval elapsing while the average sound intensity of the residual sound decays 60 db. (decibels) or, in other words, from any given value to one one-millionth of that value. A decibel (abbreviated "db.") is the exact equivalent of the obsolete term "transmission unit". It is given by the relation $N = 10 \log_{10} P_1/P_2$ where $N$ is the number of decibels by which the powers $P_1$ and $P_2$ differ.

A further object is to provide apparatus capable of giving a direct reading of the time it takes the residual sound to deteriorate a determined amount.

This invention accomplishes the above objects by providing a device from which the reverberation time is obtained by reading the voltage and hence the time of charge of a condenser by means of a galvanometer. The condenser is so arranged in the circuit that when the sound source is cut off, it is connected to a battery of known voltage through a known resistance where it remains on charge until the residual sound level has fallen to a predetermined value, at which time a relay in the detector circuit will release. The release of this relay immediately disconnects the condenser from the battery and connects it to a discharge circuit including a galvanometer. The deflection of the galvanometer is calibrated in time, thus giving a direct reading of the elapsed period.

In another embodiment of this invention the average reading of several consecutive measurements may be obtained. In this case an auxiliary condenser is used to accumulate a predetermined number of consecutive charges from another condenser. The auxiliary condenser is then discharged through a galvanometer calibrated to give the average reading of a predetermined number of measurements.

Referring to the drawing:

Fig. 1 shows a circuit arrangement embodying the invention; and

Fig. 2 shows a modification of the circuit of Fig. 1 to obtain directly an average value of reverberation time from a series of successive tests.

Referring to Fig. 1, 1 represents an oscillation generator for supplying a loud speaker 2 with energy of the desired constant or warble frequency. This energy which is furnished by the oscillation generator 1 is amplified by amplifier 3. The energy is picked up by a condenser type transmitter 4 (usually associated with its own amplifier), is amplified by a resistance coupled amplifier 5 and finally energizes the operating winding of differential relay 6 in the plate circuit of the amplifier to close contact 7. Connected in series with the biasing winding of relay 6 are a battery 28, an adjustable resistance 27 and a milliammeter 18. A switch 8 is provided for simultaneously short-circuiting loud speaker 2 and connecting a condenser 9 of known capacity to a battery 10 of known voltage through known resistances 20 and 21 where it remains on charge until the sound level due to reverberation has fallen to the required level at which time relay 6 will release. A galvanometer 11 in series with a high resistance 23 is connected in parallel with the condenser 9 through the normally closed contact 24 of the relay 6, to measure the charge accumulated in the condenser 9.

A suitable level of acoustic density is chosen according to the nature of the space under test, the amount of extraneous noise, capacity of the loud speaker, etc. The energy is first brought to a steady state at the desired level of acoustic density by energizing the loud speaker 2 with the oscillator 1. With the oscillator 1 maintaining this steady state, an attenuator 12 is inserted whose constants are such as to decrease the current in the plate circuit by 60 db. when it is included in the microphone circuit. Care should be taken that the constant sound intensity is at a high enough level so that 60 db. in the microphone input will not reduce the circuit level below the level produced by extraneous noise in the room. With the attenuator 12 inserted, the grid bias of amplifier 5 is varied to bring the plate current to a set value on the steep part of its characteristics. With the plate circuit of the amplifier 5 adjusted at a set value, differential relay 6 is biased so that any higher value of plate current holds the relay 6 on its front contact 7; and when the current falls off to the set value, the relay 6 will release or close its back contact 24. A resistance 16 is furnished to match the impedance of the tube as required. A milliammeter 17 is also furnished in the plate circuit of the tube in order to note the current corresponding to the 60 db. loss. It is also used to observe visually the nature of the sound decay rate. A second milliammeter 18 is shown in circuit with the biasing winding of relay 6 to indicate when the ampere turns of the bias winding exactly counter-balance the ampere turns due to the plate circuit current while the room is in a steady state before the loud speaker is cut out. Milliammeter 18 may also be used to indicate the change in plate current necessary to cause release of relay 6.

The microphone circuit has by the above means been prepared so that when the attenuator 12 is removed the same intensity of sound from the loud speaker will provide a holding current for the relay 6 which will fall to a releasing value only when the input has fallen 60 db. below the initial value due to cutting off the loud speaker.

The attenuator 12 is then removed from the microphone circuit. The device is now ready to proceed with the test. By pressing the button on switch 8 the circuit containing relay 19 is closed. Relay 19 operates to cut out the loud speaker 2 thus disconnecting the source of sound and simultaneously closes a circuit which connects condenser 9 to a battery 10 of known voltage. Condenser 9 is charged by battery 10 through known resistances 20 or 21 until the input to the microphone circuit has fallen 60 db. below the initial value thus releasing relay 6 which will open the contact 7 and close the contact 24, immediately disconnecting the condenser 9 from the battery 10 and connecting it to a discharge circuit including the galvanometer 11 and the resistance 23. Resistances 20 and 21 are of different values so that by closing or opening switch 22 the time of charge of the condenser may be varied. The deflection of the galvanometer 11 measures the amount of charge accumulated in the condenser 9. Knowing the values of the capacity of the condenser 9 and the resistances 20 or 21, the curve of charge-voltage versus time is readily computed by means of the following formula:

$$e = E\epsilon^{-\frac{t}{RC}}$$

Where $e$ is the instantaneous terminal voltage of the condenser, $E$ the voltage of the known battery, $\epsilon$ is the base of the Naperian logarithms or the number 2.71828, $t$ the time of charge from zero to $e$, $R$ the known resistance through which the condenser is charged and $C$ the capacity of the condenser.

The deflection of the galvanometer 11 may also be calibrated in time and thus a direct reading in time of the reverberation period may be quickly obtained.

After reading galvanometer 11 the button of switch 8 is released and the test is at an end. Releasing the button of switch 8 opens the circuit containing relay 19 and closes a circuit containing the condenser 9 and galvanometer 11. In this way the capacity of the condenser 9 is maintained at zero and will be ready for the next test.

It is desirable in measuring the rate of decay of wave energy in a room to take several readings for each point on the time-sound decay curve. Fig. 2 shows a modified form of one of the units of the meter shown in Fig. 1, which, if substituted for the latter makes it possible to directly obtain an average value of reverberation time from a series of successive tests. Replacing the unit containing galvanometer 11 and resistance 23 at terminals 30 and 31, by the unit shown in Fig. 2, the device operates as follows: By pressing the button on switch 8 the circuit containing relay 19 is closed. Relay 19 operates to cut out the loud speaker 2 thus disconnecting the source of sound and simultaneously closes a circuit which connects condenser 9 to a battery 10 of known voltage. Condenser 9 is charged by battery 10 through known resistances 20 or 21 until the input to the microphone circuit has fallen 60 db. below the initial value when relay 6 will release opening contact 7 and closing contact 24. Keys 39 and 40 which are normally out of contact with contacts 33, 34, 35 and 36 are pressed downward and close contacts 33 and 34. The voltage of condenser 9 which represents the reverberation time of the room between the sound levels under test is discharged into condenser 32. After the discharge of condenser 9 into condenser 32 the contacts at 33 and 34 are opened by releasing keys 39 and 40. The button of switch 8 is then released opening the circuit containing relay 19 and closing a circuit containing the condenser 9 in order to maintain its capacity at zero while the room is being restored to its original steady state by energizing the loud speaker 2 with the oscillator 1. When the sound energy has reached the desired level again the button at switch 8 is pressed, and the test is repeated as above described. After the desired number of tests have been taken the charge in condenser 32 will represent the sum of the charges previously received by condenser 9 during each one of the tests. Keys 39 and 40 are then pressed to make contact at 35 and 36 thus connecting condenser 32 to a discharge circuit including the galvanometer 38 and the resistance 37. The deflection of the galvanometer 38 measures the amount of charge accumulated in the condenser 32 and if calibrated in time, a direct reading in time will be obtained which will be equal to the sum of the times obtained in each of several readings. By the practice of taking ten readings on each point of the time-sound decay curve, the galvanometer 38 may be calibrated to read the average of ten observations directly.

What is claimed is:

1. The method of determining the average time of decay of residual sound from one level to a lower level which consists in storing energy in a condenser during repeated decay periods transferring said energy at the end of each period to an auxiliary condenser and measuring the total quantity of energy stored in said auxiliary condenser.

2. The method of directly obtaining an average reading of repeated tests determining the time of decay of residual sound from one predetermined level to another which consists in charging a condenser during each period of decay of the residual sound, storing each charge in a second condenser after the residual sound has reached the lower predetermined level and causing said cumulative energy to operate a device calibrated to indicate the average rate of decay.

3. In a measuring device the combination with a source of sound energy, means for deenergizing said source, a sound detector for translating sound from said source into electric currents, means for amplifying said electric currents, means operative when said currents have decayed to a predetermined value, means associated with said current operative means for determining the time of decay of the sound to a predetermined lower level, said means comprising a condenser, means for charging said condenser during said period of time, said charging means being controlled by said deenergizing means, and means for measuring said charge at the end of said period, said charge measuring means being controlled by said current operative means.

4. In an electrical circuit for measuring the time of decay of residual sound wave energy from one level to a lower level, a condenser, a source of known potential, a time measuring device and means for connecting said source to said condenser and maintaining said connection during the time of decay from one level to a lower level, said means being adapted to disconnect said condenser from said source at the lower level and to connect it to said time measuring device.

5. In a measuring device the combination with a source of sound energy, means for deenergizing said sound source, a sound detector for translating sound from said source into electric currents, means operative when said currents have decayed to a predetermined value, a condenser, a battery to charge said condenser during said period of decay, said operative means controlling the charge of said condenser, and means for obtaining an additive time decay reading of repeated charges in said condenser between similar sound levels, said means comprising a second condenser to accumulate said charges and means to indicate the cumulated charges.

6. In a measuring device the combination with a source of sound energy, means for deenergizing said sound source, a sound detector for translating sound from said source into electric currents, means operative when said currents have decayed to a predetermined value, a condenser, a battery to charge said condenser during said period of decay, said operative means controlling the charge in said condenser, and means to measure the average time of decay of repeated charges in said condenser between similar sound levels, said means comprising a second condenser to accumulate the charges of said first condenser and a galvanometer to measure the cumulated charge in said second condenser, said galvanometer being calibrated in time so as to give a direct average reading.

7. In a measuring device the combination with a source of sound of means for directly determining the time of decay of the sound from said source to a predetermined level, said means comprising a sound detector for translating sounds into corresponding electrical currents, a condenser, a battery for charging said condenser, a galvanometer to measure the charge on said condenser, a relay for simultaneously deenergizing said source of sound and connecting said condenser to said battery and a second relay associated with said detector for controlling the time of charge of said condenser and adapted to operate when the currents have decayed to a predetermined value to discharge said condenser through said galvanometer.

In witness whereof, I hereunto subscribe my name this 7th day of January, 1931.

FRANK H. HIBBARD.